S. F. Leavitt.
Horse Hay-Fork.

No. 49897. Patented Sep. 12, 1865.

Witnesses.
W. H. Burridge
A. W. McClelland

Inventor.
S. F. Leavitt

UNITED STATES PATENT OFFICE.

S. F. LEAVITT, OF NORTH FAIRFIELD, OHIO.

IMPROVEMENT IN HORSE HAY-FORKS.

Specification forming part of Letters Patent No. 49,897, dated September 12, 1865.

*To all whom it may concern:*

Be it known that I, S. F. LEAVITT, of North Fairfield, in the county of Huron and State of Ohio, have invented certain new and useful Improvements in Hay-Forks; and I do hereby declare that the following is a full and complete description of the construction and operation of the same, reference being had to the accompanying drawings, making a part of this specification, in which—

Figure 1:
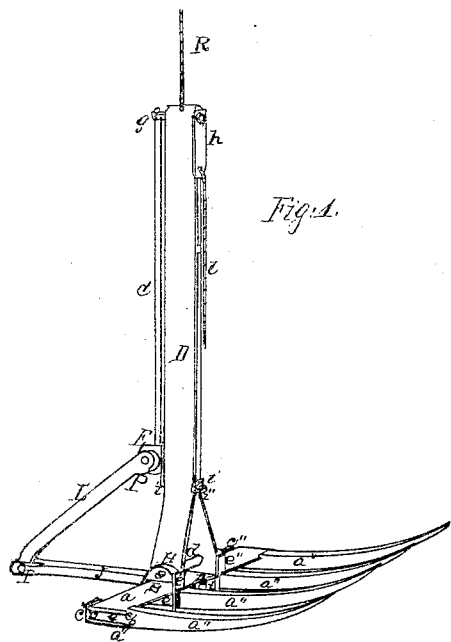
Figure 3:
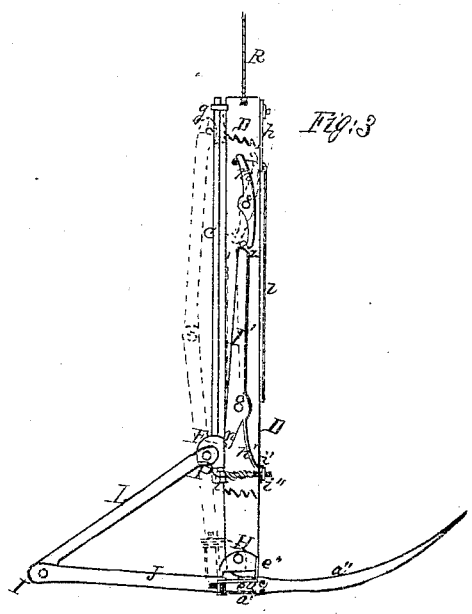
Figure 2:
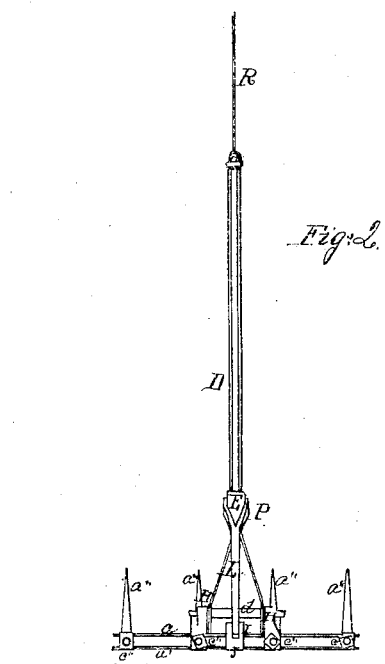
Figure 4:
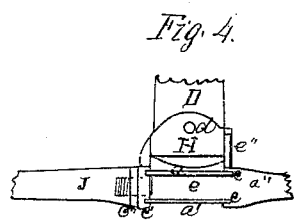

Figure 1 is a perspective view of the fork. Fig. 2 is a view of the rear end. Fig. 3 is a side view, with a part broken away to show an arrangement of devices on the inside for operating the fork. Fig. 4 is a sectional view.

Like letters of reference denote like parts in the several views.

My improvement relates to hay-forks, as hereinafter described.

The head B of the fork consists of two plates, $a$ and $a'$, that the shanks $e$ of the tines $a''$ are placed between and secured in the following manner: In the shanks of the outer tines are grooves $c$, into which the front edges of the plates fit, as shown in Fig. 4, which is an enlarged view, and the plates fit on the shanks above and below the width of the plates, as represented. On the end of the shanks are washers $c'$, grooved out in the same manner to receive the edges of the plates at the other side, a nut, $c''$, being screwed onto the end of the shank, securing them all in place. On the inner tines are plates $e''$, to which are connected lugs H, that extend down on the other side of the head, that with the plates $e''$ are grooved out like the washers to fit onto the edges of the plates, the shanks extending between them, with screw-nuts on the outer ends. In this way the plates $a\ a'$ are held securely and firmly their whole length on the shanks of the tines, forming a light but strong head for the rake.

To the lugs H is pivoted or hung an arm, D, which is made of two plates or one plate doubled together in the middle and secured a uniform distance apart by a grooved plate, $h$, and lug $g$ at the upper end and washers $i\ i'$ near the lower end, fitting onto the edges of the plates in the same manner as before described of the washers $c'$ on the edges of the plates, forming the head B. From the washers $i\ i'$ the plates incline outward, through the lower ends of which is a pin, $d$, that connects the arm to the lugs. An arm formed in this way of plates, like the head B, is very strong and light. C is a rod in rear of the arm, that passes through a lug, $g$, secured in the upper end of the arm, and the lower end turns so as to extend through the washers $i\ i'$ on the edges of the plates, and is secured by a screw-nut, $i''$, on the end, as seen in Fig. 1. E is a head on the rod, that slides up and down on it, as will be again referred to.

To the head is pivoted at $p$ a connecting-rod, L, as represented. The other end of this rod is pivoted at I to a lever, J, which is secured to the middle of the head B of the rake by extending between the plates, like the shanks, a shoulder being formed on one side, with grooves to receive the edges of the plates, and on the other or front side of the head B there is a washer, $r$, and nut $r'$, as seen in Fig. 1, fastening it firmly to the head.

In the arm D, between the plates, is arranged a lever, $m$, that operates a catch, I'. The lever is pivoted at $o$ to the plates, and to the upper end is attached a cord, $l$, that passes out through a hole in the plate $h$. The lower end of the lever is formed into a catch, Z, that fits or catches into a hook, $t$, at the upper end of the catch I'. The catch I' is pivoted at $o'$ to the arm, and the lower end is formed into a catch, $n$, that fits into a notch or catch in the sliding head E.

R is a cord or rope attached to the upper end of the arm D, by which the fork is suspended.

The manner of using this fork as constructed in elevating, loading, or unloading hay is as follows: The fork is let down and inserted in the hay in the position shown in the drawings, being securely held in that position by the catch $n$ fitting into the notch in the head E, and held there by the spring $n'$; or as the head is moved down on the rod the catch is sprung into place. When the tines are placed in the hay so as to take up a load, the fork with the hay is elevated and swung over into the bay or place to receive the hay. Then by pulling the cord $l$ the lever $m$ moves the catch $n$ out of the notch in the head, the lever and catch being in the position indicated by the dotted lines, when the tines, by the weight of the hay, will at once turn down, the hay sliding off and the head E sliding up on the rod, until the fork is in the position indicated by the dotted lines in Fig. 3.

What I claim as my improvement, and desire to secure by Letters Patent, is—

1. The arrangement of the plates $a\ a'$, shank $e$, with the grooves $c$, and grooved washers $c'$, substantially as and for the purpose set forth.

2. The catch $l'$, spring $n'$, and lever $m$, in combination with the head E and rod C, arranged as and for the purpose set forth.

3. Constructing the arm D of one entire plate or plates, with a space between, as and for the purpose set forth.

S. F. LEAVITT.

Witnesses:
 W. H. BURRIDGE,
 A. W. McCLELLAND.